United States Patent
Jiang et al.

(10) Patent No.: US 10,038,979 B1
(45) Date of Patent: Jul. 31, 2018

(54) SYSTEM AND METHOD FOR RANGING-ASSISTED POSITIONING OF VEHICLES IN VEHICLE-TO-VEHICLE COMMUNICATIONS

(71) Applicant: QUALCOMM INCORPORATED, San Diego, CA (US)

(72) Inventors: Libin Jiang, Bridgewater, NJ (US); Shailesh Patil, Raritan, NJ (US); Jubin Jose, Belle Mead, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/668,941

(22) Filed: Aug. 4, 2017

Related U.S. Application Data

(60) Provisional application No. 62/452,400, filed on Jan. 31, 2017.

(51) Int. Cl.
| | |
|---|---|
| *H04L 27/00* | (2006.01) |
| *H04W 4/02* | (2018.01) |
| *G08G 1/16* | (2006.01) |
| *H04W 56/00* | (2009.01) |
| *H04W 4/04* | (2009.01) |
| *H04W 72/04* | (2009.01) |

(52) U.S. Cl.
CPC ............ *H04W 4/023* (2013.01); *G08G 1/163* (2013.01); *H04W 4/046* (2013.01); *H04W 56/006* (2013.01); *H04W 72/048* (2013.01)

(58) Field of Classification Search
CPC .................................................. H04W 4/023
USPC ......................................................... 375/295
See application file for complete search history.

(56) References Cited

U.S. PATENT DOCUMENTS

| | | | |
|---|---|---|---|
| 8,040,829 B2 | 10/2011 | Wood et al. | |
| 8,971,297 B2 | 3/2015 | Otani et al. | |
| 9,129,532 B2 | 9/2015 | Rubin et al. | |
| 2013/0003575 A1 | 1/2013 | Konishi et al. | |
| 2013/0271324 A1* | 10/2013 | Sendonaris | G01S 5/02 342/450 |
| 2014/0293988 A1* | 10/2014 | Han | H04L 5/0085 370/344 |
| 2016/0044618 A1* | 2/2016 | Sheng | H04W 56/0005 370/329 |

FOREIGN PATENT DOCUMENTS

| | | |
|---|---|---|
| WO | 2016048509 A1 | 3/2016 |
| WO | 2016048510 A1 | 3/2016 |
| WO | 2017007386 A1 | 1/2017 |

OTHER PUBLICATIONS

Xu Q., "Vehicle-to-Vehicle Safety Messaging in DSRC", Proceedings of the 1st ACM International Workshop on Vehicular AD HOC Networks, VANT, Oct. 1, 2004, pp. 19-28.
International Search Report and Written Opinion—PCT/US2018/013041—ISA/EPO—dated Mar. 20, 2018.

* cited by examiner

*Primary Examiner* — Lihong Yu
(74) *Attorney, Agent, or Firm* — Smith Tempel Blaha, LLC

(57) ABSTRACT

A method for ranging includes randomly selecting a symbol in each of at least two successive sub-cycles of a ranging cycle, transmitting symbol IDs corresponding to the randomly selected symbols and a sequence ID, and transmitting a ranging signal with the sequence ID on each of the randomly selected symbols.

24 Claims, 15 Drawing Sheets

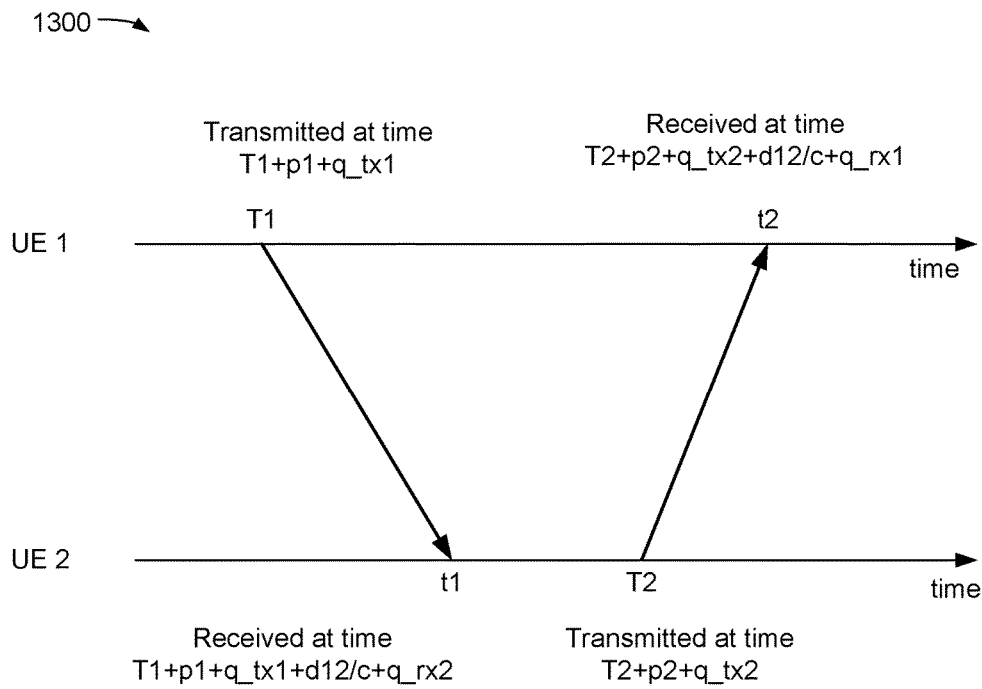

1300

Transmitted at time
T1+p1+q_tx1

Received at time
T2+p2+q_tx2+d12/c+q_rx1

UE 1 ———T1————————————t2———→ time

UE 2 ———————t1————————T2———→ time

Received at time
T1+p1+q_tx1+d12/c+q_rx2

Transmitted at time
T2+p2+q_tx2

T1 = nominal transmission time by UE1
T2 = nominal transmission time by UE2
t1 = measured ToA of UE1 transmission as received by UE2
t2 = measured ToA of UE2 transmission as received by UE1
p1 = clock time offset of UE1
p2 = clock time offset of UE2
q_tx1 = TX chain delay of UE1
q_rx1 = RX chain delay of UE1
q_tx2 = TX chain delay of UE2
q_rx2 = RX chain delay of UE2
d12 = distance between UE1 and UE2
c = speed of light

FIG. 13

SYSTEM AND METHOD FOR RANGING-ASSISTED POSITIONING OF VEHICLES IN VEHICLE-TO-VEHICLE COMMUNICATIONS

RELATED APPLICATIONS

This application claims the benefit of U.S. Provisional Patent Application No. 62/452,400, entitled "System And Method For Ranging-Assisted Positioning Of Vehicles In Vehicle-To-Vehicle Communications," filed Jan. 31, 2017, the contents of which are hereby incorporated by reference herein in their entirety.

TECHNICAL FIELD

The technology discussed below relates to wireless communication systems, and more particularly to ranging-assisted positioning of vehicles in vehicle-to-vehicle communications. Embodiments enable and provide ranging-assisted determination of vehicle location for communication, including scenarios where efficient resource allocation for ranging signals may provide accurate vehicle positioning in vehicle-to-vehicle communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). An example of an advancement to LTE technology is referred to as 5G. The term 5G represents an advancement of LTE technology including, for example, various advancements to the wireless interface, processing improvements, and the enablement of higher bandwidth to provide additional features and connectivity.

Wireless communications devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, a drone, or may be any other connected device. When the UE is a vehicle, such as an automobile, the D2D communication may be referred to as vehicle-to-vehicle (V2V) communication. Other vehicle-based UE communications may include vehicle-to-everything (V2X), which may include V2V, vehicle-to-infrastructure (V2I), vehicle-to-network (V2N), and vehicle-to-pedestrian (V2P). Vehicle-to-everything (V2X) communications and particularly, V2V communications will become more and more important in the future for collision avoidance and autonomous driving.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for ranging. Method embodiments can include randomly selecting a symbol in each of at least two successive sub-cycles of a ranging cycle, transmitting symbol IDs corresponding to the randomly selected symbols and a sequence ID, and transmitting a ranging signal with the sequence ID on each of the randomly selected symbols.

Another aspect of the disclosure provides an apparatus for ranging comprising a randomly selected symbol in each of at least two successive sub-cycles of a ranging cycle, a transmitter configured to transmit symbol IDs corresponding to the randomly selected symbols and a sequence ID, and the transmitter configured to transmit a ranging signal with the sequence ID on each of the randomly selected symbols.

Another aspect of the disclosure provides a device including means for randomly selecting a symbol in each of at least two successive sub-cycles of a ranging cycle, means for transmitting symbol IDs corresponding to the randomly selected symbols and a sequence ID, and means for transmitting a ranging signal with the sequence ID on each of the randomly selected symbols.

Another aspect of the disclosure provides a non-transitory computer-readable medium storing computer executable code for ranging, the code executable by a processor to randomly select a symbol in each of at least two successive sub-cycles of a ranging cycle, transmit symbol IDs corresponding to the randomly selected symbols and a sequence ID, and transmit a ranging signal with the sequence ID on each of the randomly selected symbols.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 13 is a timing diagram showing the ranging signals transmitted and received by two UEs, in accordance with various aspects of the present disclosure.

DETAILED DESCRIPTION

Figure 1:
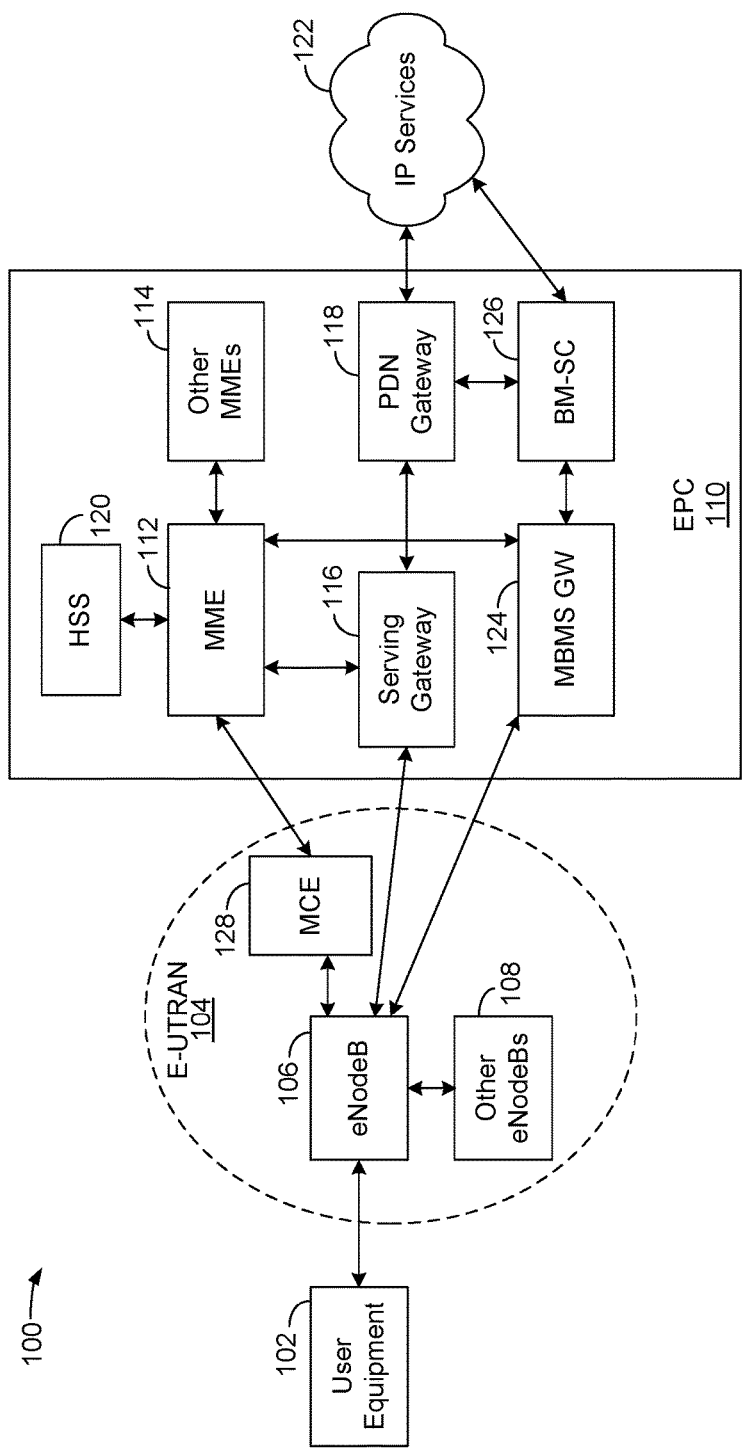
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to device-to-device (D2D) and, more particularly, vehicle-to-vehicle (V2V) communication in which an efficient ranging protocol allows efficient ranging-assisted vehicle positioning in vehicle-to-vehicle communications.

In an exemplary embodiment, the one or more RF antennas may be used for V2X, V2V, or other vehicle-to-everything ranging with other cars, objects, etc., using, for example only, the 5.9 GHz spectrum for intelligent transport systems (ITS). A vehicle may broadcast its GPS position or location to other vehicles or objects.

Accurate vehicle location determination and positioning has potential applications in collision avoidance and autonomous driving. Current GPS location determination and positioning can provide accuracy of roughly 2-3 meters in open-sky conditions. To improve the accuracy of vehicle location determination to the order of centimeters, such as, for example, low-centimeter ranges such as one or less than one centimeter to a few centimeters, ranging between and among vehicles and RSUs (road-side units) is useful. Vehicles and RSUs are referred to as "UEs". The term "ranging" refers to measuring the distances between pairs of UEs or pairs of antennas on respective UEs. The measured distances can be combined with GPS positions (which are broadcast by the UEs) to refine the UE position estimation.

Due to the high mobility of vehicles, ranging among vehicles should be performed in a "snapshot" of time. In other words the ranging signals sent by different vehicles should occur very close in time. For example, when vehicles travel at 140 km/h on a freeway in both directions, their positions change by 3.89 meters in 100 milliseconds (ms). If the ranging signals are sent in a span of 100 ms, then during that time the positions of vehicles have changed by a few meters. This leads to inaccurate estimation of positions even if the ranging operation is very accurate.

Therefore, it is desirable to minimize the number of ranging signals that are transmitted within a given period of time. If ranging signals are transmitted between each pair of UEs among N UEs, then O(N^2) ranging signals are needed, which is more than what is considered acceptable given the vehicles' anticipated speed and location change per unit of time.

Other challenges for accurate ranging include time offsets (clock offsets) among UEs, which should be compensated to derive the correct distance between UEs; the half-duplex communication constraint; and near-far effect, which degrades the reception performance of ranging signals.

Embodiments described herein include an efficient ranging protocol in which the ranging signals are concentrated in a very short period of time, in an exemplary embodiment, on the order of 1-4 milliseconds (ms), although other time periods are possible.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS 100 can interconnect with other access networks, but for simplicity those entities/interfaces are not shown. As shown, the EPS 100 provides packet-switched services; however, as those skilled in the art will readily appreciate, the various concepts presented throughout this disclosure may be extended to networks providing circuit-switched services. Moreover, while an LTE network is illustrated as an example, other types of networks may also be used, including, for example only, a 5G network.

The E-UTRAN 104 includes a base station, such as, for example, the evolved Node B (eNB) 106 and other eNBs 108, which may include a gNodeB (gNB), a Home NodeB, a Home eNodeB, or a base station using some other suitable terminology. For example, in 5G or New Radio (NR) networks, a base station may be referred to as a gNB. The E-UTRAN 104 may also include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, a drone, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
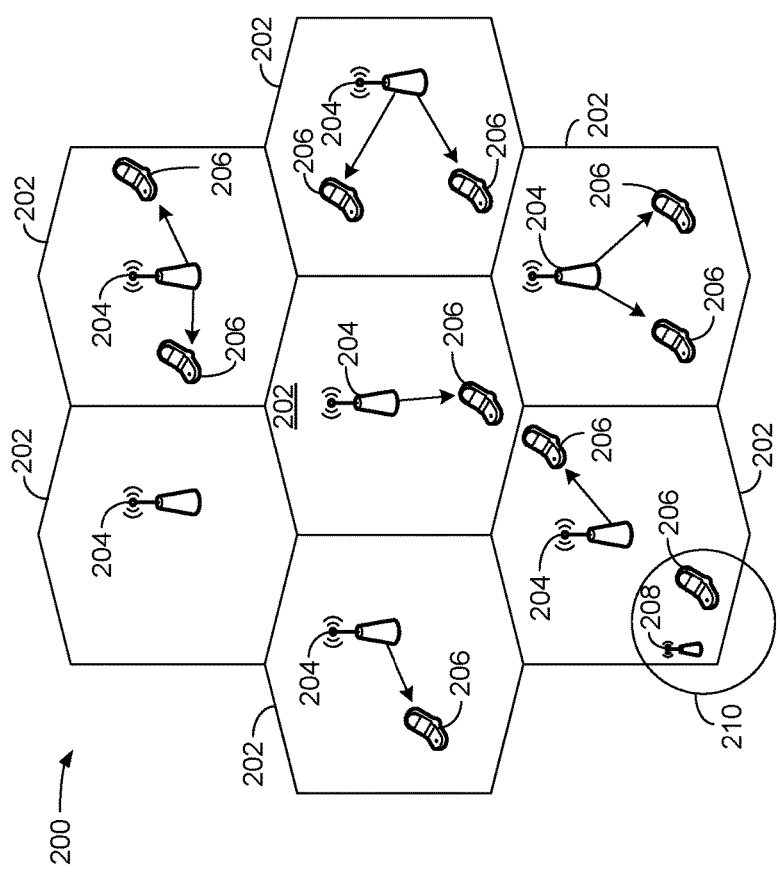
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs/gNBs 208 may have cellular regions 210 that overlap with one or more of the cells 202. The lower power class eNB/gNB 208 may be a femto cell (e.g., home eNB (HeNB)), pico cell, micro cell, or remote radio head (RRH). The macro eNBs/gNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs/gNBs 204 are responsible for all radio related functions including radio bearer control, admission control, mobility control, scheduling, security, and connectivity to the serving gateway 116. An eNB/gNB may support one or multiple (e.g., three) cells (also referred to as a sectors). The term "cell" can refer to the smallest coverage area of an eNB/gNB and/or an eNB/gNB subsystem serving a particular coverage area. Further, the terms "eNB," "gNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs/gNBs 204 may have multiple antennas supporting MIMO technology. The use of MIMO technology enables the eNBs/gNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB/gNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
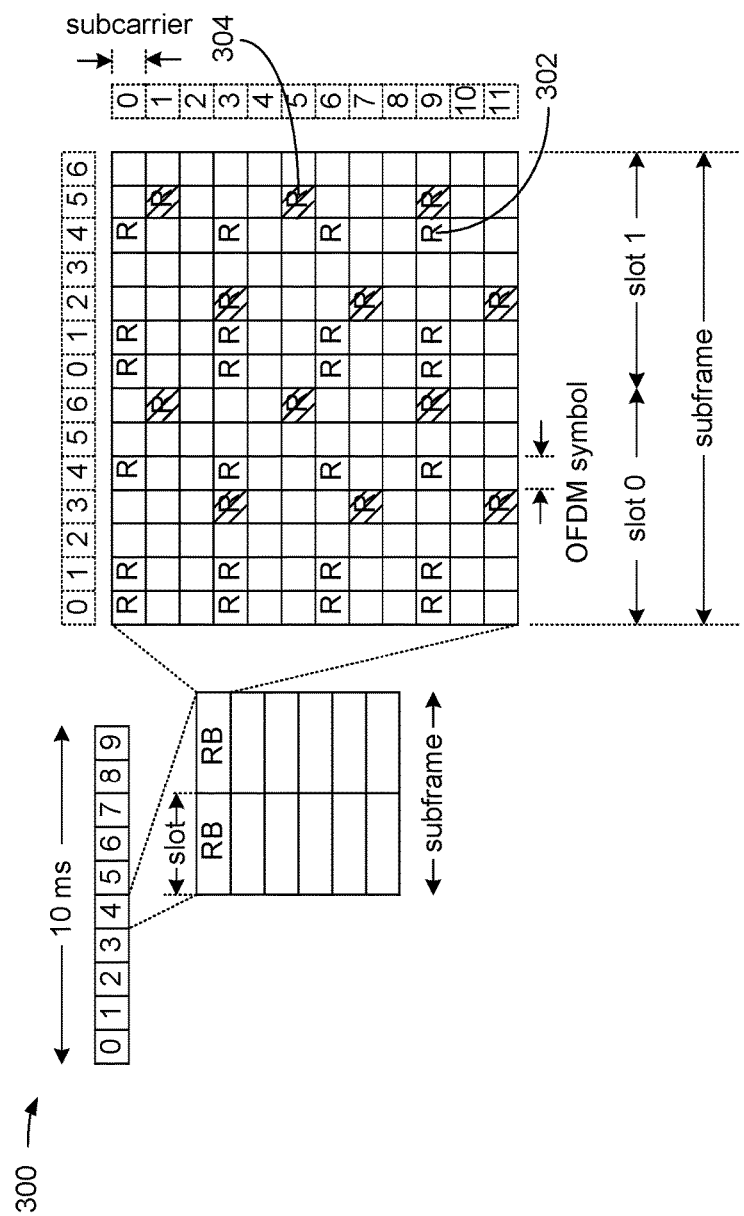
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
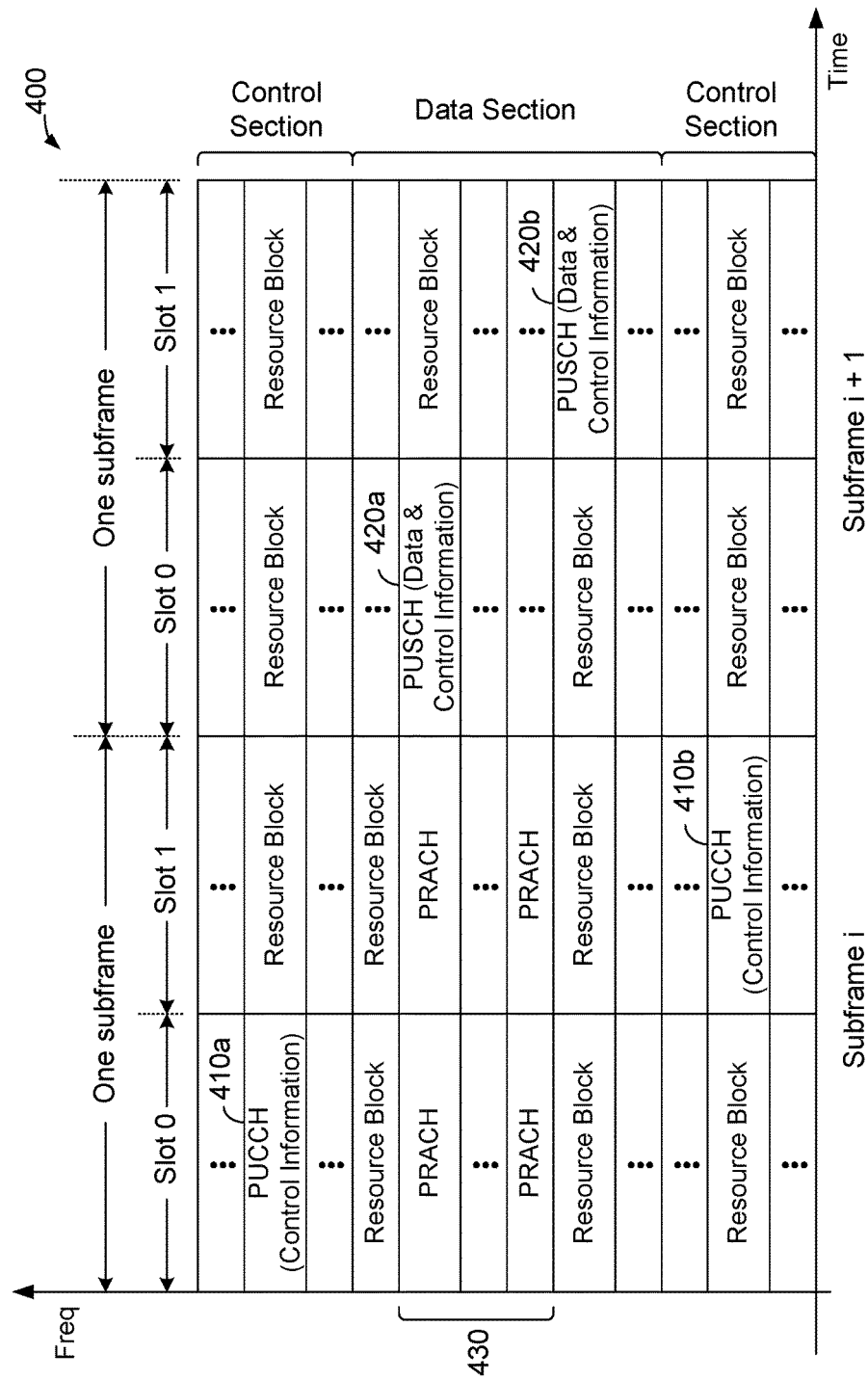
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB/gNB. The UE may also be assigned resource blocks 420a, 420b in the data section to transmit data to the eNB/gNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
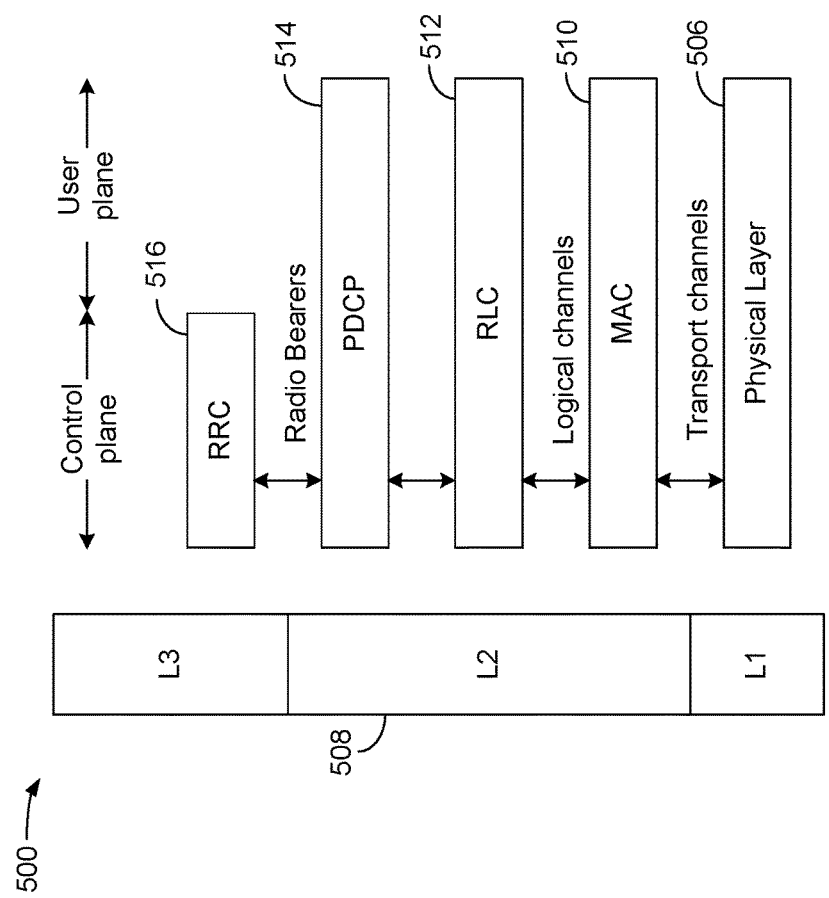
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3.

Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
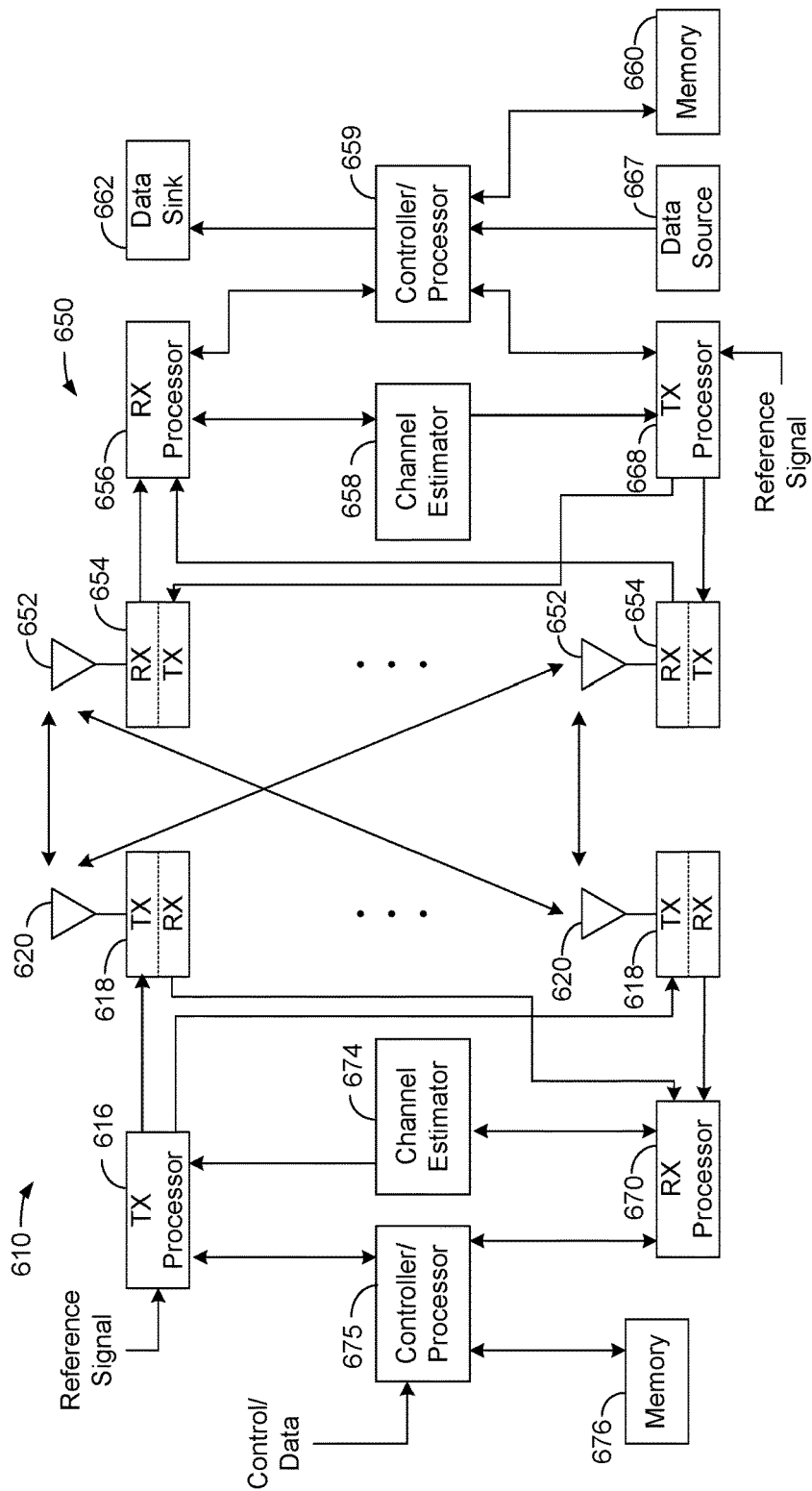
FIG. 6 is a diagram illustrating an example of an evolved Node B and user equipment in an access network in accordance with various aspects of the present disclosure.

FIG. 6 is a block diagram of an eNB/gNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
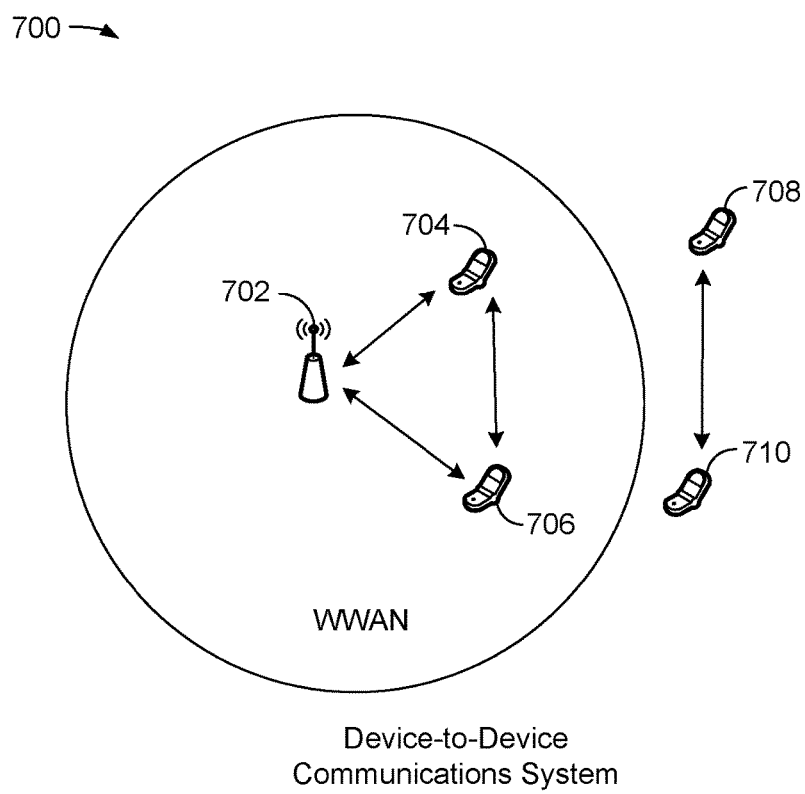
FIG. 7 is a diagram of a device-to-device communications system in accordance with various aspects of the present disclosure.

FIG. 7 is a diagram of a device-to-device (D2D) communications system 700 in accordance with various aspects of the present disclosure. The device-to-device communications system 700 may be implemented by the network shown in FIG. 1, and, in an exemplary embodiment, includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

In one configuration, some or all of the UEs 704, 706, 708, 710 may be equipped or located on vehicles. In such a configuration, the D2D communications system 700 may also be referred to as a vehicle-to-vehicle (V2V) communications system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Future generations of vehicles capable of autonomous driving or operation will demand collision avoidance capability that uses centimeter-level accuracy in vehicle positioning or locating, such as, for example, low-centimeter ranges such as less than one centimeter to a few centimeters. However, the accuracy of current GPS positioning is about 2-3 meters even in open sky, or otherwise ideal, conditions.

Figure 8:
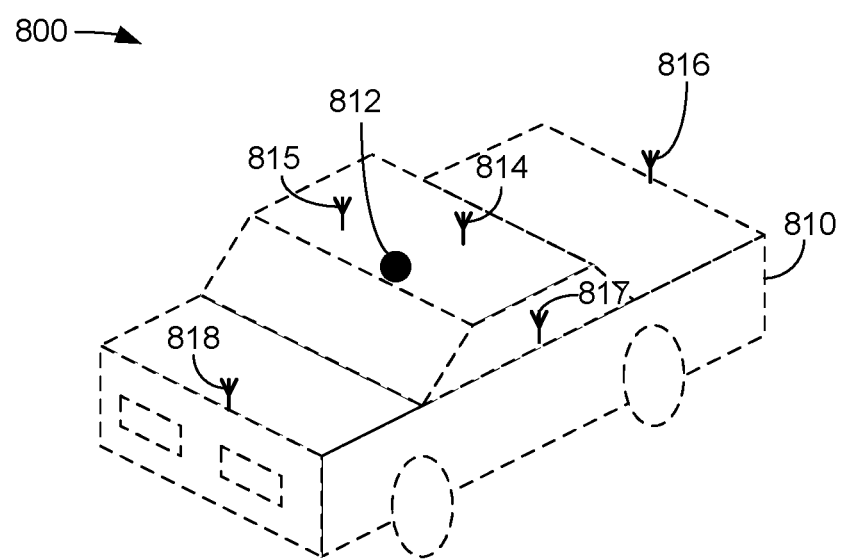
FIG. 8 is a schematic diagram illustrating a vehicle for use in device-to-device communications, in accordance with various aspects of the present disclosure.

FIG. 8 is a schematic diagram 800 illustrating a vehicle for use in device-to-device communications, in accordance with various aspects of the present disclosure. In an exemplary embodiment, the device in FIG. 8 can be a UE and can be located on, located in, or can comprise a vehicle 810. In an exemplary embodiment, the vehicle 810 may comprise a GPS antenna 812, and one or more radio frequency (RF) antennas. In an exemplary embodiment, the vehicle 810 may comprise RF antennas 814, 815, 816, 817 and 818, configured to perform vehicle-to-vehicle (V2V) ranging, vehicle-to-everything (V2X) ranging, or other vehicle ranging operations. However, the vehicle 810 may comprise more or fewer RF antennas. In an exemplary embodiment, the RF antennas 814, 815, 816, 817 and 818 may be located at generally the periphery, or edges, of the vehicle 810. For example, the RF antenna 814 may be located on the roof of the vehicle 810. The RF antenna 815 may be located on one side of the vehicle 810, for example, the driver's side for a left-hand drive vehicle 810. The RF antenna 816 may be located on the front edge of the vehicle 810. The RF antenna 817 may be located on one side, for example, the passenger side for a left-hand drive vehicle 810. The RF antenna 818 may be located on the rear edge of the vehicle 810. The GPS antenna 812 may be in operative communication with one or more GPS satellites. The RF antennas 814, 815, 816, 817 and 818 may be in operative communication with one or more base stations (for example, one or more eNBs shown, for example, in FIG. 1 and FIG. 2), or one or more UEs (also shown, for example, in FIG. 1 and in FIG. 2).

Figure 9:
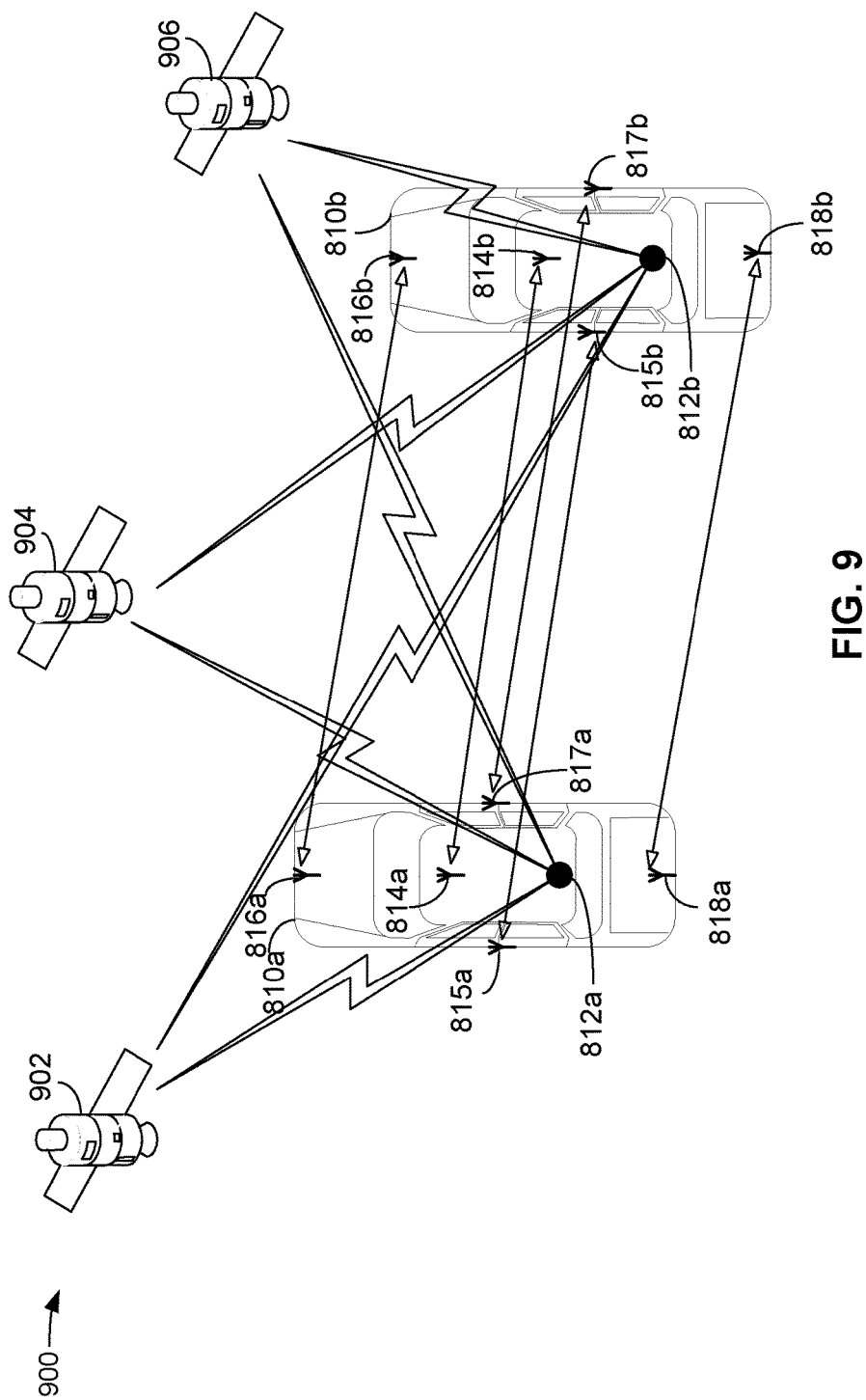
FIG. 9 is a schematic diagram illustrating a V2V communication system, in accordance with various aspects of the present disclosure.

FIG. 9 is a schematic diagram illustrating a V2V communication system, in accordance with various aspects of the present disclosure. The communication system 900 comprises GPS satellites 902, 904 and 906 in communication with two vehicles, a first vehicle 810a and a second vehicle 810b. Although only two vehicles are shown in FIG. 9, it should be understood that there may be more or fewer vehicles in such a communication system.

The first vehicle 810a may comprise a GPS antenna 812a, and one or more radio frequency (RF) antennas. In an exemplary embodiment, the first vehicle 810a may comprise RF antennas 814a, 815a, 816a, 817a and 818a. In an exemplary embodiment, the RF antennas 814a, 815a, 816a, 817a and 818a may be located at generally the periphery, or edges, of the first vehicle 810a. For example, the RF antenna 814a may be located on the roof of the first vehicle 810a. The RF antenna 815a may be located on one side, for example, the driver's side for a left-hand drive first vehicle 810a. The RF antenna 816a may be located on the front edge of the first vehicle 810a. The RF antenna 817a may be located on one side, for example, the passenger side for a left-hand drive first vehicle 810a. The RF antenna 818a may be located on the rear edge of the first vehicle 810a. In an exemplary embodiment, the first vehicle 810a may be an embodiment of the vehicle 810 of FIG. 8.

The second vehicle 810b may comprise a GPS antenna 812b, and one or more radio frequency (RF) antennas. In an exemplary embodiment, the second vehicle 810b may comprise RF antennas 814b, 815b, 816b, 817b and 818b. In an exemplary embodiment, the RF antennas 814b, 815b, 816b, 817b and 818b may be located at generally the periphery, or edges, of the second vehicle 810b. For example, the RF antenna 814b may be located on the roof of the second vehicle 810b. The RF antenna 815b may be located on one side, for example, the driver's side for a left-hand drive second vehicle 810b. The RF antenna 816b may be located on the front edge of the second vehicle 810b. The RF antenna 817b may be located on one side, for example, the passenger side for a left-hand drive second vehicle 810b. The RF antenna 818b may be located on the rear edge of the second vehicle 810b. In an exemplary embodiment, the second vehicle 810b may be an embodiment of the vehicle 810 of FIG. 8.

In an exemplary embodiment, the first vehicle 810a and the second vehicle 810b are in operative communication with GPS satellites 902, 904 and 906. Although three GPS satellites are shown in FIG. 9, more or fewer GPS satellites may be in operative communication with the first vehicle 810a and the second vehicle 810b. In an exemplary embodiment, the GPS antenna 812a on the first vehicle 810a generates a GPS location. Similarly, the GPS antenna 812b on the second vehicle 810b generates a GPS location.

In an exemplary embodiment, the RF antennas 814a, 815a, 816a, 817a and 818a each transmit a ranging signal using distinct radio parameters, or radio resources, which can differentiate the ranging signal transmitted by each of the RF antennas 814a, 815a, 816a, 817a and 818a. Similarly, the RF antennas 814b, 815b, 816b, 817b and 818b each transmit a ranging signal using distinct radio parameters, or radio resources, which can differentiate the ranging signal transmitted by each of the RF antennas 814b, 815b, 816b, 817b and 818b.

In an exemplary embodiment, the RF antenna 814a transmits a ranging signal that can be received and decoded by the RF antenna 814b. Similarly, the RF antenna 814b transmits a ranging signal that can be received and decoded by the RF antenna 814a.

In an exemplary embodiment, the RF antenna 815a transmits a ranging signal that can be received and decoded by the RF antenna 815b. Similarly, the RF antenna 815b transmits a ranging signal that can be received and decoded by the RF antenna 815a.

In an exemplary embodiment, the RF antenna 816a transmits a ranging signal that can be received and decoded by the RF antenna 816b. Similarly, the RF antenna 816b transmits a ranging signal that can be received and decoded by the RF antenna 816a.

In an exemplary embodiment, the RF antenna 817a transmits a ranging signal that can be received and decoded by the RF antenna 817b. Similarly, the RF antenna 817b transmits a ranging signal that can be received and decoded by the RF antenna 817a.

In an exemplary embodiment, the RF antenna 818a transmits a ranging signal that can be received and decoded by the RF antenna 818b. Similarly, the RF antenna 818b transmits a ranging signal that can be received and decoded by the RF antenna 818a.

In an exemplary embodiment, any of the RF antennas 814a, 815a, 816a, 817a and 818a can be configured to operatively communicate with any of the RF antennas 814b, 815b, 816b, 817b and 818b and any of the RF antennas 814b, 815b, 816b, 817b and 818b can be configured to operatively communicate with any of the RF antennas 814a, 815a, 816a, 817a and 818a.

In an exemplary embodiment, at least one RF antenna on the first vehicle 810a performs a ranging operation with at least one RF antenna located on the second vehicle 810b to develop one or more ranging measurements. The ranging measurement can be obtained using the techniques described herein.

Although illustrated as an automobile, the vehicle 810 may be other types of vehicles, such as, for example, a drone, a manned or an unmanned aerial vehicle, a remote controlled vehicle, or any other vehicle or object.

Figure 10:
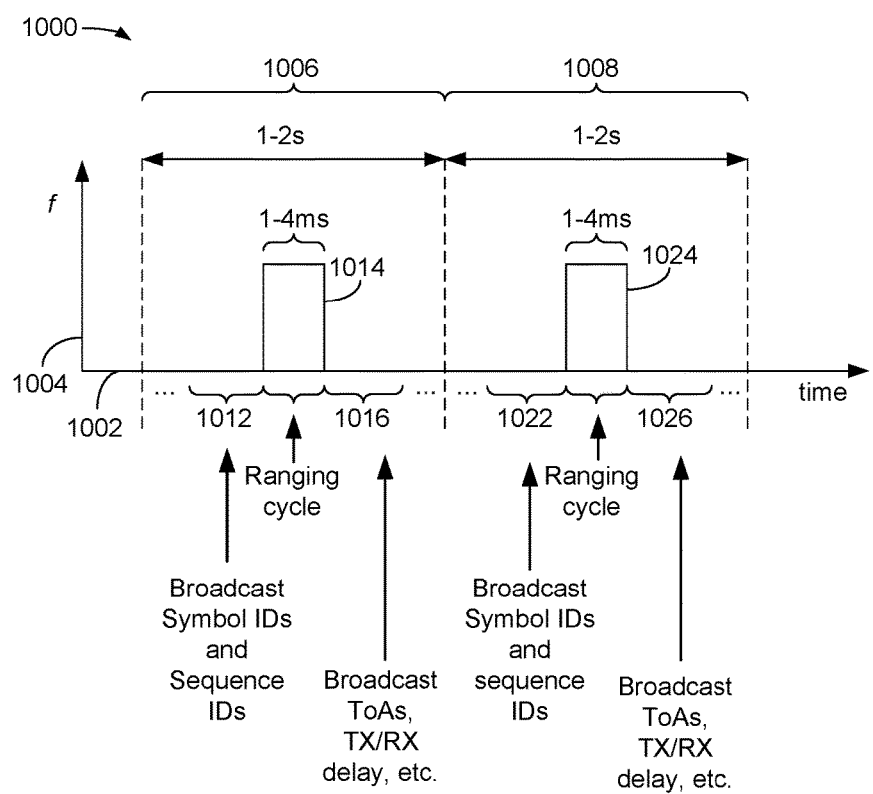
FIG. 10 is a schematic diagram showing a portion of a communication timeline having an embodiment of a protocol for ranging-assisted positioning of vehicles in a vehicle-to-vehicle communication system.

FIG. 10 is a schematic diagram 1000 showing a portion of a communication timeline having an embodiment of a protocol for ranging-assisted positioning of vehicles in a vehicle-to-vehicle communication system. The timeline 1000 includes a horizontal axis 1002 showing time increasing to the right and a vertical axis 1004 showing frequency, f, increasing upwardly. The timeline 1000 shows a communication period 1006 and a communication period 1008. In an exemplary embodiment, the duration of the communication periods 1006 and 1008 may be, for example only, one (1) to two (2) seconds (s) in duration.

In an exemplary embodiment, the communication period 1006 comprises a first period 1012 during which a UE may broadcast one or more symbol IDs and sequence IDs, a second period 1014 during which a UE may be in a ranging cycle and transmitting ranging signals, and a third period 1016, during which a UE may broadcast ranging information, such as, for example, time of arrival (ToA) information, system delay information including, for example, transmit (TX) and receive (RX) delay, etc. A sequence ID sent in the first period 1012 may indicate a particular sequence in a set of sequences, such as Zadoff-Chu sequences. In an exemplary embodiment, the second period 1014, also referred to as the "ranging cycle" may occur over a very brief period of time, such as, for example only, one (1) to four (4) milliseconds (ms). In an exemplary embodiment, the total duration of the first period 1012, the second period 1014, and the third period 1016 may be significantly less than the duration of the communication period 1006. For example, the total duration of the first period 1012, the second period 1014, and the third period 1016 may be on the order of 50 milliseconds (ms), or some other duration that may be less than the duration of the communication period 1006.

In an exemplary embodiment, the communication period 1008 is similar to the communication period 1006 and comprises a first period 1022 during which a UE may broadcast one or more symbol IDs and sequence IDs, a second period 1024 during which a UE may be in a ranging cycle and transmitting ranging signals, and a third period 1026, during which a UE may broadcast ranging information, such as, for example, ToA information, transmit (TX) and receive (RX) delay, etc. In an exemplary embodiment, the second period 1024, also referred to as the "ranging cycle" may occur over a very brief period of time, such as, for example only one (1) to four (4) milliseconds (ms). In an exemplary embodiment, the total duration of the first period 1022, the second period 1024, and the third period 1026 may be significantly less than the duration of the communication period 1008. For example, the total duration of the first period 1022, the second period 1024, and the third period 1026 may be on the order of 50 milliseconds (ms), or some other duration that may be less than the duration of the communication period 1008.

During the ranging cycle 1014, 1024, at times when a UE is not transmitting and not in a TX/RX or RX/TX transition period, the UE may attempt to measure the ToA of ranging signals sent by other UEs. In an exemplary embodiment, the ToAs are measured with respect to the subject UE's own clock.

In an exemplary embodiment, not all UEs may be transmitting information in the third period 1016, 1026. As will be explained below in FIG. 13, a UE, such as, for example, a first UE, (for example, UE 1), may send ToA information and TX/RX delay information in the third period 1016, 1026 to allow at least another, or second UE (for example, UE 2), to cancel the clock offset between UE 2 and UE 1 and allow UE 2 to estimate the distance between UE 2 and UE 1. However, in some scenarios, the second UE, UE 2, may not be interested in the distance between UE 2 and UE 1. Therefore, in such a scenario, UE 1 may not transmit information in the third period 1016, 1026. An example is V2I (Vehicle-to-Infrastructure) ranging, where vehicles attempt to estimate the distances from a number of RSUs with known GPS positions, and subsequently estimate their own positions. In this example, only RSUs transmit information in the third period 1016, 1026. A vehicle can estimate its distance from an RSU after receiving ToA, TX/RX delay information from the RSU.

Due to the half-duplex nature of the V2V communication (i.e., a UE cannot receive when it is transmitting or transmit when it is receiving), and near-far effect (a UE may fail to receive the ranging signal from a faraway UE when a nearby UE transmits at the same time), a UE may fail to receive one or more ranging signals. In accordance with an exemplary embodiment, the ranging signals sent during the ranging cycle 1014, 1024, may be repeated in pseudo-randomly chosen symbol(s) in successive ranging sub-cycles. In an exemplary embodiment, the seed used to generate the pseudo-random-number may be the UE identifier, ID.

Figure 11:
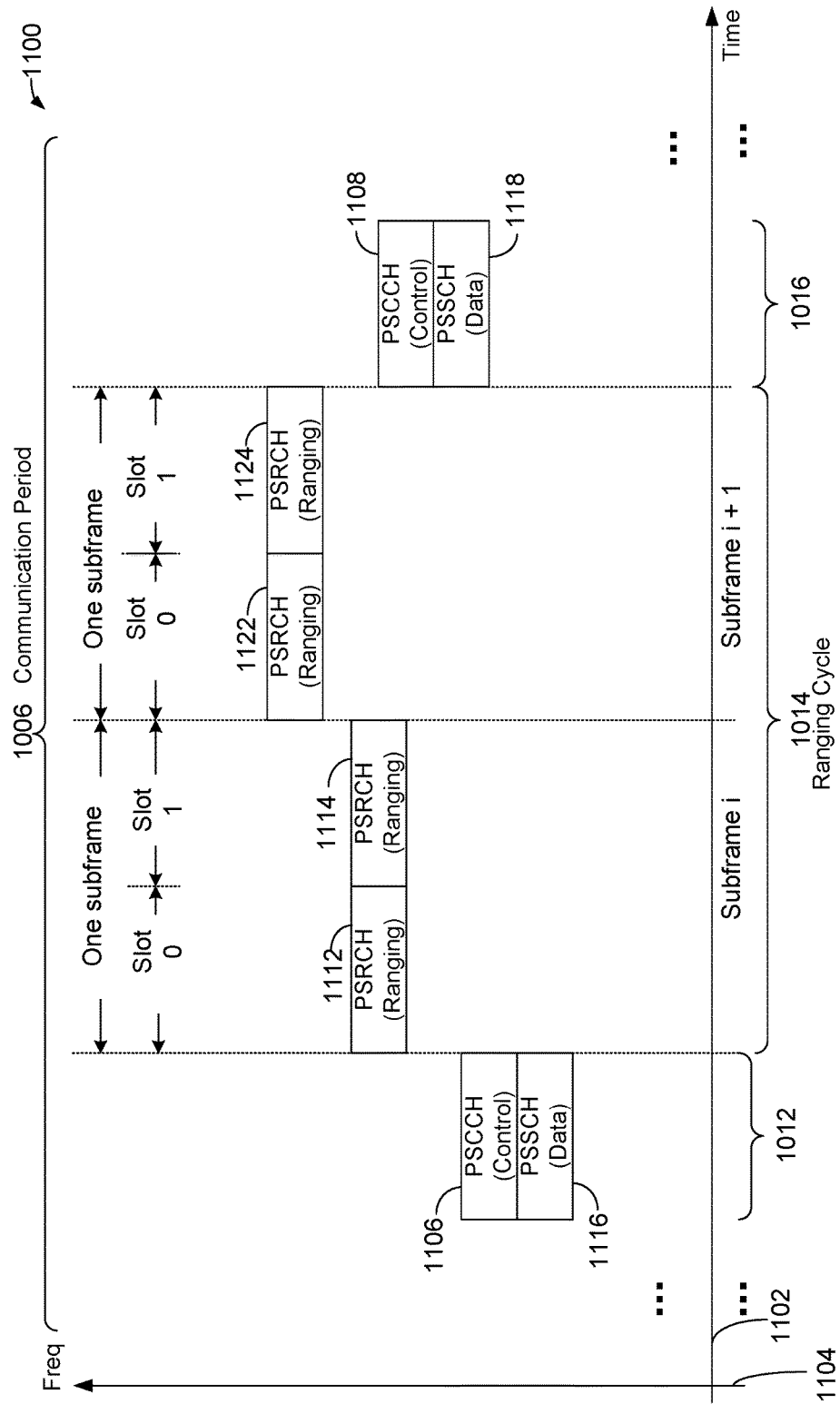
FIG. 11 is a diagram illustrating a data structure in accordance with various aspects of the present disclosure.

FIG. 11 is a diagram illustrating a data structure 1100 in accordance with various aspects of the present disclosure. In an exemplary embodiment, the data structure 1100 may comprise a number of radio resources that can be used for direct vehicle to vehicle (V2V) and/or vehicle-to-everything (V2X) communication. These resources may be generally referred to as "sidelink" resources and may be used to communicate over a "sidelink channel" whereby a vehicle (or other device or object) can communicate directly with another vehicle or device or object without communicating with a base station. The data structure 1100 includes a horizontal axis 1102 showing time increasing to the right and a vertical axis 1104 showing frequency, f, increasing upwardly.

The data structure 1100 may comprise some or all of a sidelink communication and may also be referred to as a communication frame. The data structure 1100 may comprise an exemplary embodiment of the communication period 1006 or 1008 of FIG. 10. For illustrative purposes only, the communication period 1006 of FIG. 10 is shown in FIG. 11.

In an exemplary embodiment, the data structure 1100 shows the communication period 1006 having the first period 1012, the second period 1014, and the third period 1016 (FIG. 10). In an exemplary embodiment, the first period 1012 may be used to transmit a physical sidelink control channel (PSCCH) communication 1106 and a corresponding physical sidelink shared channel (PSSCH) communication 1116. The PSCCH communication 1106 may contain information about the resource and MCS (modulation and coding scheme) used by the corresponding PSSCH communication 1116. The PSSCH communication 1116 may contain one or more symbol IDs and sequence IDs as mentioned herein. In an exemplary embodiment, the third period 1016 may be used to transmit a PSCCH communication 1108, during which a UE may broadcast resource information, modulation and coding scheme (MCS) information, and a corresponding PSSCH communication 1118, during which a UE may broadcast ranging information, such as, for example, ToA information, transmit (TX) and receive (RX) delay, etc., as mentioned herein. In an exemplary embodiment, the ToA information, the transmit (TX) and receive (RX) delay, and other information may be measured by a UE during times when a UE is not transmitting and not in a TX/RX or RX/TX transition period.

In an exemplary embodiment, the second period 1014 may be used to transmit a ranging communication, such as, for example only, a physical sidelink ranging channel (PSRCH) communication. The second period 1014 may comprise a first subframe, subframe i, and a second subframe, subframe i+1. The first subframe, subframe i, and the second subframe, subframe i+1 may also be referred to as ranging sub-cycles.

In an exemplary embodiment, the first subframe, subframe i, may comprise a PSRCH communication 1112 and a PSRCH communication 1114. In an exemplary embodiment, the second subframe, subframe i+1, may comprise a PSRCH communication 1122 and a PSRCH communication 1124. The PSRCH communications 1112, 1114, 1122 and 1124 shown in FIG. 11 are associated with a single exemplary vehicle or UE; however, multiple vehicles, or UEs, will typically generate and transmit the ranging communications as described herein. Further, although the PSRCH communications 1112, 1114, 1122 and 1124 are illustrated as filling respective communication subframe i and subframe i+1, it is understood that the PSRCH communications 1112, 1114, 1122 and 1124 from a UE will typically use one or a very few number of communication symbols within each subframe, or ranging sub-cycle. Further still, although shown in FIG. 11 as using a sidelink communication channel, a UE may transmit its ranging signals using other communication spectrums, such as, for example only, an ultra-wideband (UWB) communication channel, or other communication spectrum.

Figure 12:
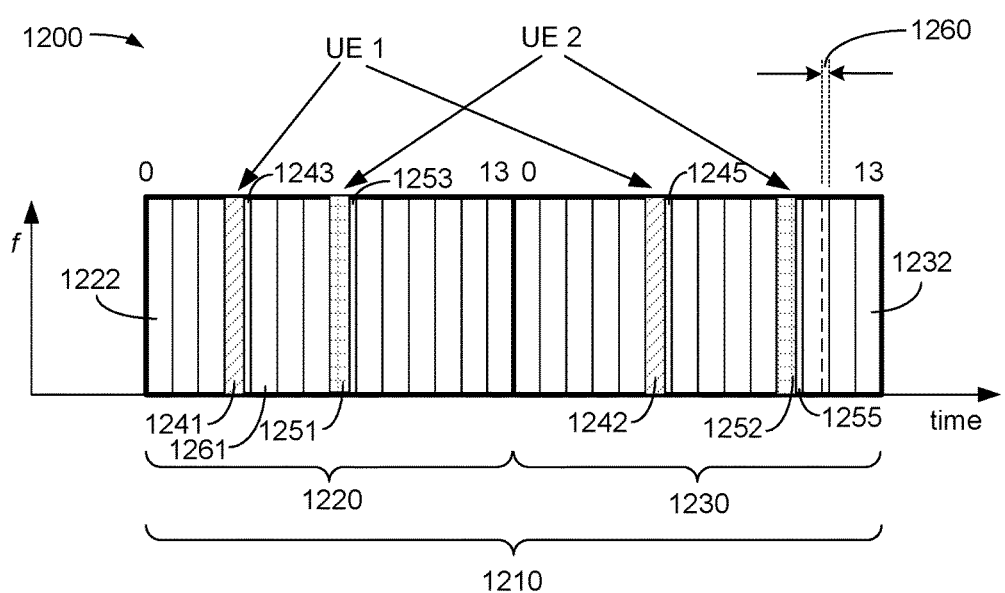
FIG. 12 is a schematic diagram showing a ranging cycle of FIG. 10 and FIG. 11 in additional detail, in accordance with various aspects of the present disclosure.

FIG. 12 is a schematic diagram 1200 showing an exemplary ranging cycle of FIG. 10 and/or FIG. 11 in additional detail, in accordance with various aspects of the present disclosure. In an exemplary embodiment, a ranging cycle 1210 may be an exemplary embodiment of the ranging cycle 1014 or the ranging cycle 1024 of FIG. 10 or FIG. 11. In an exemplary embodiment, a ranging cycle 1210 may comprise M ranging sub-cycles. In an exemplary embodiment, the number "M" is chosen to be relatively small, such as, for example only, 2 or 3. In an exemplary embodiment, the ranging cycle 1210 may comprise a first sub-cycle 1220 and a second sub-cycle 1230. In an exemplary embodiment, the ranging cycle 1210 may have a duration of approximately 2 ms, and each sub-cycle 1220 and 1230 may have a duration of approximately 1 ms, which may correspond to a communication subframe. In an exemplary embodiment using the LTE communication methodology, the first sub-cycle 1220 may comprise 14 symbols 1222, referred to using the nomenclature 0-13, comprising a slot 0 having exemplary symbols 0-6, and a slot 1 having exemplary symbols 7-13. Similarly, the second sub-cycle 1130 may comprise 14 symbols 1232, referred to using the nomenclature 0-13, comprising a slot 0 having exemplary symbols 0-6, and a slot 1 having exemplary symbols 7-13. A communication symbol may comprise a radio resource that occupies a period of time and a frequency range.

In accordance with an exemplary embodiment, before the ranging cycle 1210 begins, each UE randomly chooses one symbol in each sub-cycle 1220 and 1230, within which to broadcast a ranging signal, using a pseudo-random selection process. For example, a first UE, UE 1, may choose a symbol 1241 (symbol 3) in sub-cycle 1220 and symbol 1242 (symbol 5) in sub-cycle 1230. A second UE, UE 2, may choose a symbol 1251 (symbol 7) in sub-cycle 1220 and symbol 1252 (symbol 10) in sub-cycle 1230. The choice of symbol in each successive sub-cycle 1220 and 1230 is pseudo-random, such that it is unlikely that two UEs would choose the same symbol in each sub-cycle. In other words, the randomly selected symbols in the two successive sub-cycles 1220 and 1230 occur in a different respective symbol position in the two successive sub-cycles 1220 and 1230.

The seed of the pseudo-random-number generator used to generate the choice of symbol in each sub-cycle may be the UE identifier, ID (UEID), making it unlikely that two different UEs would select the same symbols in the same sub-cycles. In this manner, each UE pseudo-randomly choosing communication symbols in successive sub-cycles to transmit ranging information increases the chances that each UEs ranging transmissions will be received without interference.

The chosen symbol IDs and the sequence IDs to be used by the different RF antennas for each UE in the ranging cycle 1210 are broadcast during the time period 1012 (FIG. 10 and FIG. 11) before the ranging cycle 1014 (1210 in FIG. 12). In this manner, each UE that may receive a ranging signal from the subject UE will know in which symbol a particular ranging signal will appear. The subject UE then transmits the specified ranging signals (sequences) in the specified symbols during the ranging cycle 1210.

In this manner, the impact of the half-duplex constraint and near-far effect is reduced. For example, if UE 1 cannot hear UE 2 in the first sub-cycle 1220 because they happen to choose the same symbol to transmit, it is likely that they will choose different symbols in the other sub-cycle(s), such as sub-cycle 1230. As another example, if UE 1 cannot hear UE 2 in the first sub-cycle since a third UE, UE 3, which is very close to UE 1, transmits in the same symbol as UE 2, it is likely that UE 3 will choose a different symbol from UE 2 in other sub-cycle(s).

In accordance with an exemplary embodiment, since UEs may miss some transmissions or receptions of ranging signals during a TX/RX or a RX/TX transition period, a gap may be left between adjacent symbols in the ranging cycle 1210 for TX/RX or RX/TX transition. In an exemplary embodiment, a gap 1260 is illustrated as an exemplary embodiment of a TX/RX or a RX/TX transition period. The gap 1260 is shown for exemplary purposes at the end of symbol 11 in sub-cycle 1230 (i.e., between symbol 11 and symbol 12 in the sub-cycle 1230); however, a similar gap exists at the end of, and between each symbol in all sub-cycles. Exemplary gaps 1243, 1253, 1245 and 1255 are shown at the end of respective symbols 1241, 1251, 1242 and 1252. In an exemplary embodiment, there is a TX/RX transmission gap for each symbol. However, the existence of the gap does not mean that a UE cannot listen for transmissions from other UEs during the gap, although the subject UE may not hear anything during the gap since no UE may be transmitting. The purpose of the TX/RX transition gap is for a UE to be able to transmit in a particular communication symbol and to be able to receive a communication in the next symbol. If the UE is to receive in later symbols, it has sufficient time (a TX/RX transition gap+one or more symbol times) for the TX/RX transition. For example, assume that in symbol 3, 1241, UE 1 transmits a ranging signal, but the ranging signal ends before the gap 1243. During the gap 1243, UE 1 can switch from TX mode to RX mode, such that UE 1 can receive another ranging signal transmitted by, for example, UE 3 in the next symbol 1261 (i.e., symbol 4). Therefore, in such a design, every ranging signal ends before the respective TX/RX transition gap, since the transmitter uses the TX/RX transition gap to switch from TX mode to RX mode. Further, there is no transmission of ranging signals during the gaps.

FIG. 13 is a timing diagram 1300 showing the ranging signals transmitted and received by two UEs, in accordance with various aspects of the present disclosure. The timing diagram 1300 shows time increasing to the right. The timing diagram 1300 shows a first UE, UE1 and a second UE, UE 2. The first UE, UE 1 may be, for example, the vehicle 810a of FIG. 9 and the second UE, UE 2, may be, for example, the vehicle 810b of FIG. 9. In an exemplary embodiment, a UE measures the ToA of ranging signals sent by other UEs during the ranging cycles (1014 and 1024 in FIG. 10 and during the ranging cycle 1210 in FIG. 11 when the UE is not transmitting a ranging signal). However, a UE cannot measure ranging signals transmitted by other UEs when the subject UE is transmitting or when the subject UE is in a transition between TX and RX. For example, in FIG. 12, UE 1 transmits ranging signals on symbol 3, 1241, in the sub-cycle 1220 and in symbol 5, 1242, in the sub-cycle 1230, and therefore cannot measure ToA of other UEs in these symbol times. However, UE1 can measure ToA of another UE in, for example, in symbols 0-2 and 4-13 in subcycle 1220, and in symbols 0-4 and 6-13 in sub-cycle 1230.

Due to clock time offsets among UEs, the ToAs measured by each UE will typically not reflect the actual ranging signal propagation time. To compensate for, or cancel, the clock offset of each UE, after the ranging cycle, each UE broadcasts to other UEs its measured ToAs and its own TX/RX chain delays on each of its RF antennas, during the third time period 1016, 1026 (FIG. 10). This information can be used to compensate for, or cancel, clock time offset when calculating the ranges. Alternatively, the UE may internally adjust the ToA measurements using its TX/RX chain delay and broadcast its adjusted ToAs to other UEs.

For example, consider that one RF antenna on each of UE 1 and UE 2 broadcasts a ranging signal as shown on the timing diagram 1300. The nominal transmission time for UE 1 is shown as T1 and the nominal transmission time for UE 2 is shown as T2. The measured ToA of the signal sent by UE 1 as received at UE 2 is referred to as time t1, and the measured ToA of the signal sent by UE 2 as received by UE 1 is referred to as time t2. The clock time offset of UE 1 is referred to as p1, and the clock time offset of UE 2 is referred to as p2. The TX/RX chain delay of UE 1 is referred to respectively as q_tx1 and q_rx1, and the TX/RX chain delay of UE 2 is referred to respectively as q_tx2 and q_rx2. The distance between UE 1 and UE 2 is referred to as d12 and the speed of light is referred to as c.

Accordingly, $$t1 = T1 + p1 + q\_tx1 + d12/c + q\_rx2 - p2 \quad \text{(Eq. 1)}$$

$$t2 = T2 + p2 + q\_tx2 + d12/c + q\_rx1 - p1 \quad \text{(Eq. 2)}$$

Equation 1 shows that UE 1 transmits its ranging signal at nominal time T1 (i.e., time T1 according to its clock). Since its clock has an offset of p1 compared to the true time, UE 1 actually tries to transmit at time T1+p1. After the delay of UE 1's TX chain, the propagation time d12/c, and the delay at UE 2's Rx chain, the ranging signal is received by UE 2 at time T1+p1+q_tx1+d12/c+q_rx2. However due to UE 2's clock offset, the ToA measured by UE 2 is this amount minus p2.

Equation 2 shows that UE 2 transmits its ranging signal at nominal time T2 (i.e., time T2 according to its clock). Since its clock has an offset of p2 compared to the true time, UE 2 actually tries to transmit at time T2+p2. After the delay at UE 2's TX chain, the propagation time d12/c, and the delay at UE 1's Rx chain, the ranging signal is received by UE 1 at time T2+p2+q_tx2+d12/c+q_rx1. However due to UE 1's clock offset, the ToA measured by UE 1 is this amount minus p1.

Adding the two equations, the clock offsets p1 and p2 are cancelled.

Rearranging the terms results in:

$$d12=c((t1-T1)+(t2-T2)-(q\_tx1+q\_rx1)-(q\_tx2+q\_rx2))/2. \quad (Eq.3)$$

Therefore, if UE 1 broadcasts the ToA t2 and the sum of its TX/RX chain delay q_tx1+q_rx1, and UE 2 broadcasts its ToA t1 and the sum of its TX/RX chain delay q_tx2+q_rx2, both UEs can compute d12 according to the above equation. Note that T1 and T2 are known to both UEs since the chosen symbol IDs are broadcast before the ranging cycle.

Alternatively, UE 1 can broadcast the adjusted ToA t2'=t1−(q_tx1+q_rx1), and UE 2 can broadcast the adjusted ToA t1'=t1−(q_tx2+q_rx2). This way, the distance can be computed as:

$$d12=c((t1'-T1)+(t2'-T2))/2. \quad (Eq.4)$$

Figure 14:
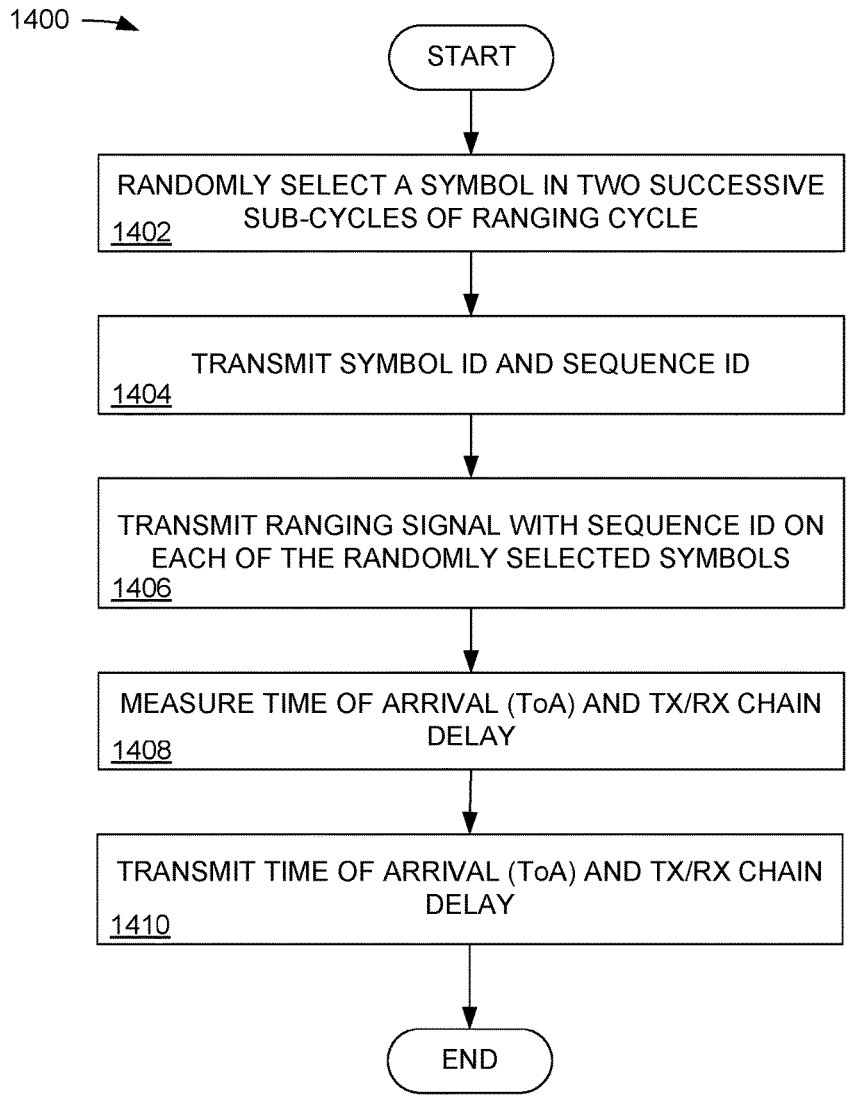
FIG. 14 is a flow chart illustrating an example of a method for communication, in accordance with various aspects of the present disclosure.

FIG. 14 is a flow chart illustrating an example of a method for communication, in accordance with various aspects of the present disclosure. The blocks in the method 1400 can be performed in or out of the order shown, and in some embodiments, can be performed at least in part in parallel.

In block 1402, a UE, such as a vehicle, randomly selects a symbol in successive sub-cycles of a ranging cycle. For example a UE may use a pseudo-random process to randomly select a symbol in each of the two successive sub-cycles 1220 and 1230 (FIG. 12).

In block 1404, symbol IDs corresponding to the randomly selected symbols and a sequence ID are transmitted. For example, a UE may transmit the symbol ID and the sequence ID using the control/processor 659, memory 660, TX processor 668, transmitter 654, and related circuitry (FIG. 6).

In block 1406, the UE transmits a ranging signal with the sequence ID on each of the randomly selected symbols. For example, a UE may transmit the ranging signal with the sequence ID on each of the randomly selected symbols using the control/processor 659, memory 660, TX processor 668, transmitter 654, and related circuitry (FIG. 6).

In block 1408, the UE measures ToA of other UEs, and measures its own TX/RX chain delay, and other information. For example, a UE may measure the ToA, and the TX/RX chain delay, and other information using the control/processor 659, memory 660, Rx processor 656, TX processor 668, transmitter/receiver 654, and related circuitry (FIG. 6).

In block 1410, the UE transmits ToA, TX/RX chain delay, and other information. For example, a UE may transmit the ToA, TX/RX chain delay, and other information using the control/processor 659, memory 660, TX processor 668, transmitter 654, and related circuitry (FIG. 6).

Figure 15:
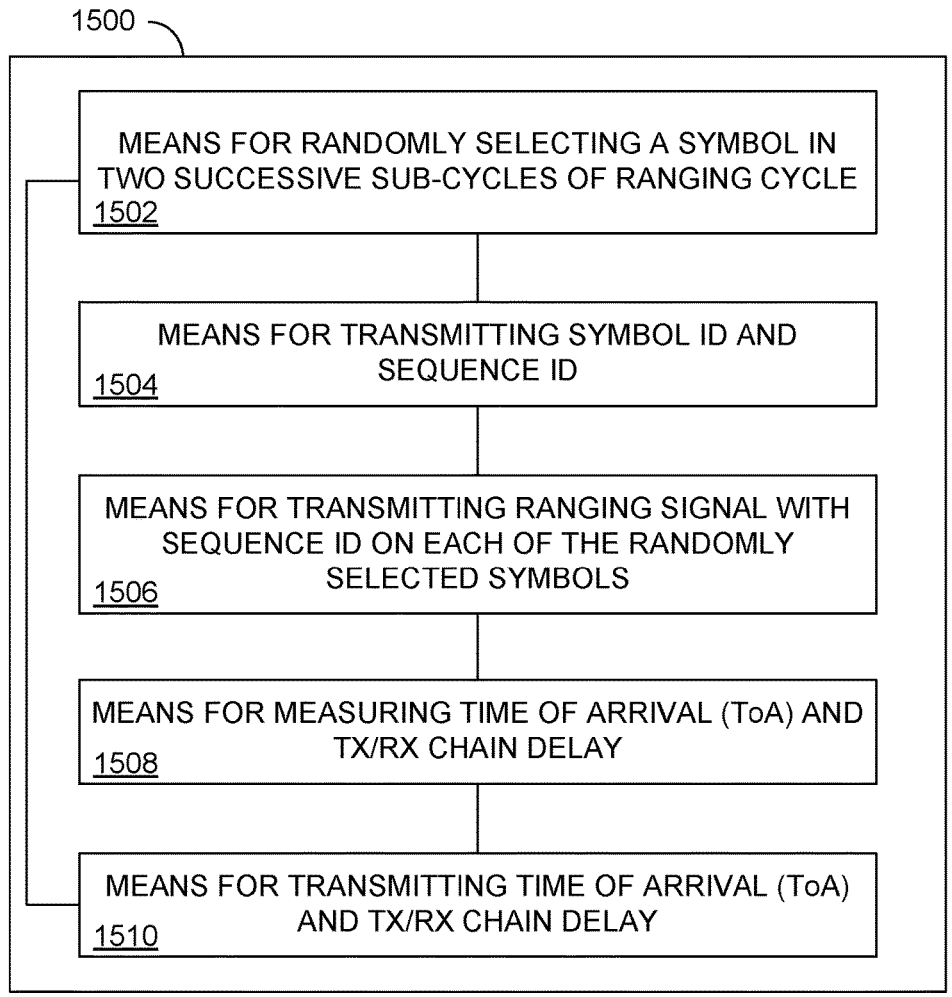
FIG. 15 is a functional block diagram of an apparatus for a communication system in accordance with various aspects of the present disclosure.

FIG. 15 is a functional block diagram of an apparatus 1500 for a communication system in accordance with various aspects of the present disclosure. The apparatus 1500 comprises means 1502 for randomly selecting a symbol in successive sub-cycles of a ranging cycle. In certain embodiments, the means 1502 for randomly selecting a symbol in successive sub-cycles of a ranging cycle can be configured to perform one or more of the function described in operation block 1402 of method 1400 (FIG. 14). In an exemplary embodiment, the means 1502 for randomly selecting a symbol in successive sub-cycles of a ranging cycle may comprise the UE using a pseudo-random process to randomly select a symbol in each of the two successive sub-cycles 1220 and 1230 (FIG. 12) using, for example, the control/processor 659, memory 660, TX processor 668, and related circuitry (FIG. 6).

The apparatus 1500 further comprises means 1504 for transmitting symbol IDs corresponding to the randomly selected symbols and a sequence ID. In certain embodiments, the means 1504 for transmitting symbol IDs corresponding to the randomly selected symbols and a sequence ID can be configured to perform one or more of the function described in operation block 1404 of method 1400 (FIG. 14). In an exemplary embodiment, the means 1504 for transmitting symbol IDs corresponding to the randomly selected symbols and a sequence ID may comprise the UE transmitting the symbol ID and the sequence ID using the control/processor 659, memory 660, TX processor 668, transmitter 654, and related circuitry (FIG. 6).

The apparatus 1500 further comprises means 1506 for transmitting a ranging signal with the sequence ID on each of the randomly selected symbols. In certain embodiments, the means 1506 for transmitting a ranging signal with the sequence ID on each of the randomly selected symbols can be configured to perform one or more of the function described in operation block 1406 of method 1400 (FIG. 14). In an exemplary embodiment, the means 1506 for transmitting a ranging signal with the sequence ID on each of the randomly selected symbols may comprise the UE transmitting the ranging signal with the sequence ID on each of the randomly selected symbols using the control/processor 659, memory 660, TX processor 668, transmitter 654, and related circuitry (FIG. 6).

The apparatus 1500 further comprises means 1508 for measuring ToA of other UEs, and measuring its own TX/RX chain delay, and other information. In certain embodiments, the means 1508 for measuring ToA of other UEs, and measuring its own TX/RX chain delay, and other information can be configured to perform one or more of the function described in operation block 1408 of method 1400 (FIG. 14). In an exemplary embodiment, the means 1508 for measuring ToA of other UEs, and measuring its own TX/RX chain delay, and other information may comprise the UE measuring the ToA, TX/RX chain delay, and other information using the control/processor 659, memory 660, Rx processor 656, TX processor 668, transmitter/receiver 654, and related circuitry (FIG. 6).

The apparatus 1500 further comprises means 1510 for transmitting ToA, TX/RX chain delay, and other information. In certain embodiments, the means 1510 for transmitting ToA, TX/RX chain delay, and other information can be configured to perform one or more of the function described in operation block 1410 of method 1400 (FIG. 14). In an exemplary embodiment, the means 1510 for transmitting ToA, TX/RX chain delay, and other information may comprise the UE may transmitting the ToA, TX/RX chain delay, and other information using the control/processor 659, memory 660, TX processor 668, transmitter 654, and related circuitry (FIG. 6).

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for ranging, comprising:
randomly selecting a symbol in each of at least two successive sub-cycles of a ranging cycle, the randomly selected symbol in each of the at least two successive sub-cycles of the ranging cycle occurring in different respective symbol positions in each of the at least two successive sub-cycles of the ranging signal;
transmitting symbol identifications (IDs) corresponding to the randomly selected symbols and a sequence ID; and
transmitting a ranging signal with the sequence ID only on each of the randomly selected symbols to determine a range to an object.

2. The method of claim 1, further comprising using a pseudo-random process to randomly select the symbol in each of at least two successive sub-cycles.

3. The method of claim 1, further comprising computing a distance using received ranging signals.

4. The method of claim 1, further comprising canceling a clock offset when receiving ranging signals.

5. The method of claim 1, further comprising transmitting time of arrival (ToA) and system delay information corresponding to a received ranging signal.

6. The method of claim 1, further comprising transmitting the ranging signal using a physical sidelink ranging channel (PSRCH).

7. An apparatus for ranging, comprising:
a randomly selected symbol in each of at least two successive sub-cycles of a ranging cycle, the randomly selected symbol in each of the at least two successive sub-cycles of the ranging cycle occurring in different respective symbol positions in each of the at least two successive sub-cycles of the ranging signal;
a transmitter configured to transmit symbol identifications (IDs) corresponding to the randomly selected symbols and a sequence ID; and
the transmitter configured to transmit a ranging signal with the sequence ID only on each of the randomly selected symbols to determine a range to an object.

8. The apparatus of claim 7, further comprising a pseudo-random process configured to randomly select the symbol in each of at least two successive sub-cycles.

9. The apparatus of claim 7, further comprising a processor configured to compute a distance using received ranging signals.

10. The apparatus of claim 7, further comprising a processor configured to cancel a clock offset when receiving ranging signals.

11. The apparatus of claim 7, further comprising the transmitter configured to transmit time of arrival (ToA) and system delay information corresponding to a received ranging signal.

12. The apparatus of claim 7, wherein the ranging signal is transmitted using a physical sidelink ranging channel (PSRCH).

13. A device, comprising:
means for randomly selecting a symbol in each of at least two successive sub-cycles of a ranging cycle, the randomly selected symbol in each of the at least two successive sub-cycles of the ranging cycle occurring in different respective symbol positions in each of the at least two successive sub-cycles of the ranging signal;
means for transmitting symbol identifications (IDs) corresponding to the randomly selected symbols and a sequence ID; and
means for transmitting a ranging signal with the sequence ID only on each of the randomly selected symbols to determine a range to an object.

14. The device of claim 13, further comprising means for using a pseudo-random process to randomly select the symbol in each of at least two successive sub-cycles.

15. The device of claim 13, further comprising means for computing a distance using received ranging signals.

16. The device of claim 13, further comprising means for canceling a clock offset when receiving ranging signals.

17. The device of claim 13, further comprising means for transmitting time of arrival (ToA) and system delay information corresponding to a received ranging signal.

18. The device of claim 13, further comprising means for transmitting the ranging signal using a physical sidelink ranging channel (PSRCH).

19. A non-transitory computer-readable medium storing computer executable code for ranging, the code executable by a processor to:
randomly select a symbol in each of at least two successive sub-cycles of a ranging cycle, the randomly selected symbol in each of the at least two successive sub-cycles of the ranging cycle occurring in different respective symbol positions in each of the at least two successive sub-cycles of the ranging signal;
transmit symbol identifications (IDs) corresponding to the randomly selected symbols and a sequence ID; and
transmit a ranging signal with the sequence ID only on each of the randomly selected symbols to determine a range to an object.

20. The non-transitory computer-readable medium of claim 19, the code executable by a processor to use a pseudo-random process to randomly select the symbol in each of at least two successive sub-cycles.

21. The non-transitory computer-readable medium of claim 19, wherein the code is executable by a processor to:
compute a distance using received ranging signals.

22. The non-transitory computer-readable medium of claim 19, wherein the code is executable by a processor to:
cancel a clock offset when receiving ranging signals.

23. The non-transitory computer-readable medium of claim 19, wherein the code is executable by a processor to:
transmit time of arrival (ToA) and system delay information corresponding to a received ranging signal.

24. The non-transitory computer-readable medium of claim 19, wherein the code is executable by a processor to:
transmit the ranging signal using a physical sidelink ranging channel (PSRCH).

* * * * *